United States Patent
Hassan et al.

(10) Patent No.: US 7,398,095 B2
(45) Date of Patent: *Jul. 8, 2008

(54) DIRECTED FLOOD OF PUSH-TO-TALK ANNOUNCE MESSAGE

(75) Inventors: Tariq A. Hassan, San Diego, CA (US); Vijaykrishna Sadagopan, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 10/730,519

(22) Filed: Dec. 8, 2003

(65) Prior Publication Data

US 2005/0124366 A1    Jun. 9, 2005

(51) Int. Cl.
*H04B 7/00* (2006.01)
*H04Q 7/20* (2006.01)
(52) U.S. Cl. .................. 455/518; 455/517; 455/519
(58) Field of Classification Search ................. 455/517, 455/518, 519
See application file for complete search history.

(56) References Cited

U.S. PATENT DOCUMENTS

| | | | |
|---|---|---|---|
| 5,914,958 A * | 6/1999 | Chinitz et al. ............... 370/441 |
| 7,260,414 B2 * | 8/2007 | Hassan et al. ............... 455/518 |
| 2002/0173326 A1 * | 11/2002 | Rosen et al. ................. 455/518 |
| 2003/0119539 A1 * | 6/2003 | Needham et al. ............ 455/518 |
| 2003/0148779 A1 * | 8/2003 | Aravamudan et al. ....... 455/519 |
| 2004/0057405 A1 * | 3/2004 | Black .......................... 370/335 |

* cited by examiner

*Primary Examiner*—Matthew Anderson
*Assistant Examiner*—Bobbak Safaipour

(57) ABSTRACT

A target handset in a wireless communication network receives a PTT call announce message that is broadcast over a plurality of base stations without first sending a page message to precisely locate the target handset. The plurality of base stations cover a geographic region in which the target handset is expect to be located. Accordingly, the call setup delay introduced by first broadcasting a page message to precisely locate the target handset is eliminated. The additional burden on the network to broadcast the larger announce message is negligible because the bandwidth available in the forward common control channel ("FCCCH") is sufficient to handle the larger message with no degradation to the network. Additionally, the announce message can be streamlined to reduce its data size and thereby minimize any additional burden on the network.

18 Claims, 6 Drawing Sheets

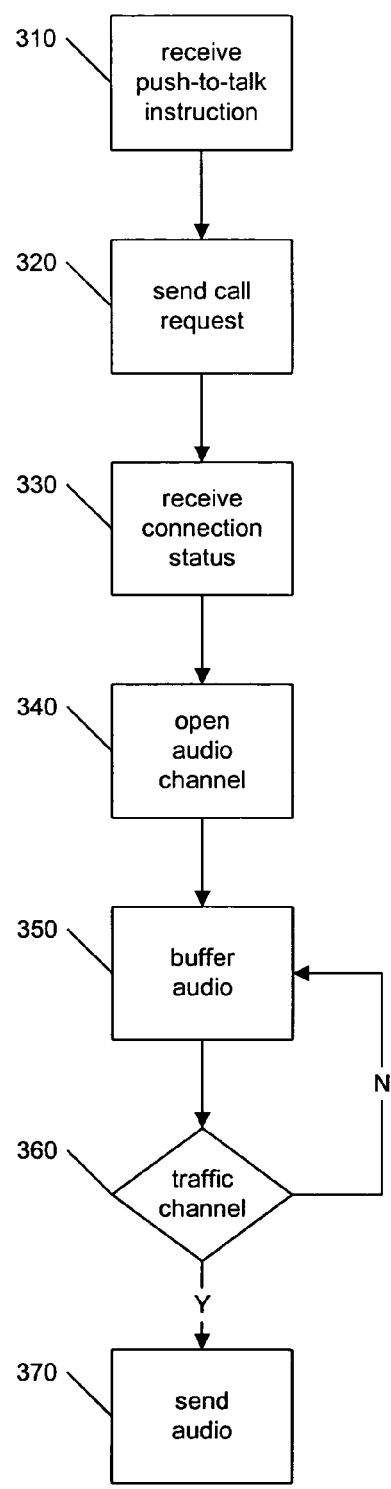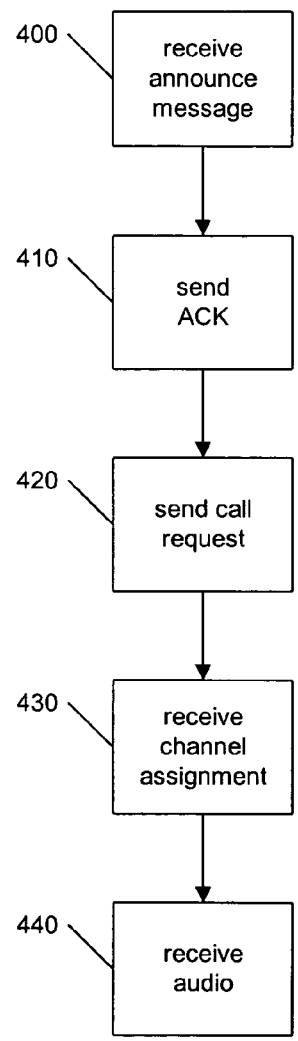
FIG. 5
FIG. 6

DIRECTED FLOOD OF PUSH-TO-TALK ANNOUNCE MESSAGE

RELATED APPLICATION

The present application relates to co-pending U.S. patent application No. 10/730,520, filed Nov. 14, 2003, and entitled OPTIMIZED PUSH-TO-TALK CALL SETUP, of concurrent ownership and which is incorporated herein by reference in its entirety.

BACKGROUND

1. Field of the Invention

The present invention generally relates to wireless communications and more specifically relates to establishing push-to-talk communication between wireless communication devices.

2. Related Art

Conventional systems and methods for establishing a push-to-talk ("PTT") call over a wireless communication network suffer from significant call setup times. Typically, a call message from a requesting handset is received by a PTT server that subsequently sends out an announce message to the target handset. In order to send the announce message to the target handset, however, the target handset must first be located. Accordingly, conventional systems first broadcast a page message over a predefined geographical region in order to precisely locate the target handset.

Once the handset has responded to the page message, and thereby identified its location in a particular cell of the wireless communication network, the announce message is sent to the target handset via the specific base station for the particular cell. A significant drawback of these conventional methods for establishing a PTT call is the amount of time required to locate the target handset. Although periodic registration of handsets in a wireless communication network is generally required, the time lapse between registration messages can vary between a few minutes and several hours. Consequently, the location of a target handset can require multiple page messages to be sent over a wide geographic area if the handset has not recently registered with the network and has moved. These multiple page messages increase the PTT call setup time.

Additionally, once the target handset has been located and received and responded to the announce message, the PTT server sends a connection status message back to the requesting handset. However, the connection status message is delayed at the base station until the wireless communication network has established a traffic channel for the PTT call. Once the traffic channel is established, then the connection status message is sent to the requesting handset over the traffic channel. This delay in delivering the connection status message significantly increases the PTT call setup time.

Therefore, what is needed is a system and method that quickly and efficiently establishes push-to-talk communications between wireless communication devices and overcomes the time consuming procedures found in the conventional systems as described above.

SUMMARY

The considerable time required by conventional systems to establish a push-to-talk call is a significant problem in the field of wireless communications. On average, conventional systems require 2.5 seconds to establish a PTT call. The present invention provides improved methods for establishing a PTT call that significantly reduce the conventional setup time.

When the PTT call announcement message is sent by the PTT server to the target handset, the announce message is broadcast over a plurality of base stations that cover a geographic region in which the target handset is expect to be located. Accordingly, the call setup delay introduced by first broadcasting a page message to precisely locate the target handset is eliminated. The additional burden on the network to broadcast the larger announce message is negligible because the bandwidth available in the forward common control channel ("FCCCH") is sufficient to handle the larger message with no degradation to the network.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is a flow diagram illustrating an example requesting handset process for establishing a push-to-talk call over a wireless communication network;

FIG. 6 is a flow diagram illustrating an example target handset process for establishing a push-to-talk call over a wireless communication network;

DETAILED DESCRIPTION

Disclosed herein are systems and methods for optimizing push-to-talk call setup over a wireless communication network. For example, one method as disclosed herein allows for a PTT call announce message to be broadcast over a plurality of base stations to a target handset. The plurality of base stations cover a geographic region in which the target handset is expect to be located. Accordingly, the additional PTT call setup delay introduced by sending a page message to precisely locate the target handset is eliminated.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
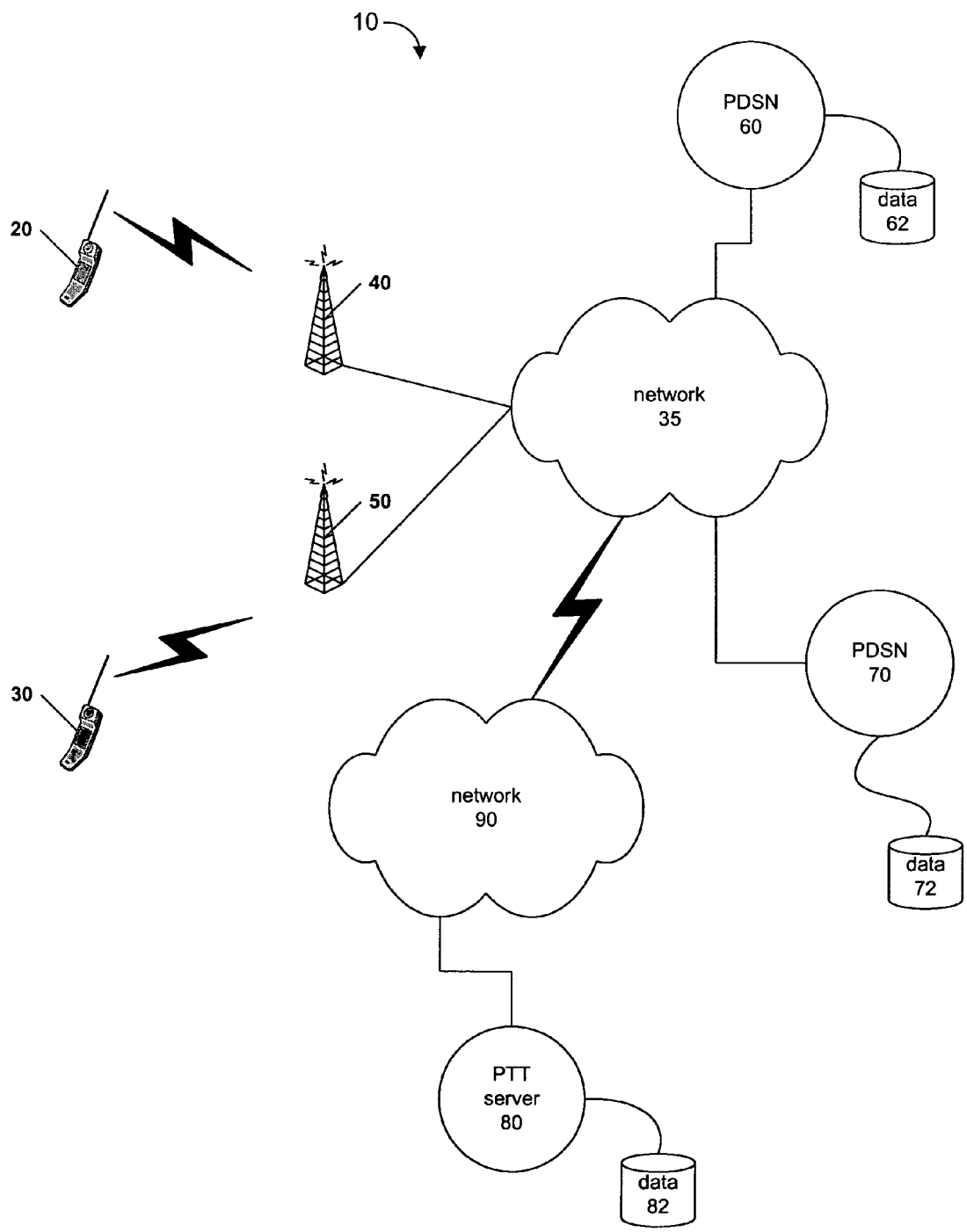
FIG. 1 is a network diagram illustrating an example wireless communication system configured to facilitate push-to-talk calls.

FIG. 1 is a network diagram illustrating an example wireless communication system 10 configured to facilitate pushto-talk calls. The system 10 comprises a plurality of wireless communication devices (also referred to as "wireless devices" and "handsets") such as handsets 20 and 30. The handsets are communicatively coupled with a wireless communication network 35 via a plurality of base stations such as base stations 40 and 50. Also connected to the wireless communication network 35 are a plurality of packet data service nodes ("PDSN") such as PDSNs 60 and 70. Each PDSN preferably is configured with a data storage area such as data storage areas 62 and 72.

The wireless communication network 35 can also be communicatively coupled with other communication networks such as network 90. In one embodiment, wireless communication network 35 is a code division multiple access 2000 ("CDMA2000") network, the specification for which is published by the 3$^{rd}$ Generation Partnership Project 2 ("3GPP2") and is incorporated herein in its entirety. For example, wireless communication network 35 may be a CDMA2000 Release A network. Network 90 can be any of a large variety of networks such as a circuit switched telephone network or a packet data network such as the Internet. In the illustrated embodiment, a PTT server 80 is communicatively coupled with the PDSNs and the handsets via network 90. Alternatively, the PTT server 80 can be part of the wireless communication network 35. PTT server 80 is also configured with a data storage area 82.

As is understood by those skilled in the art, packet data communications over the wireless communication network 35 are routed throughout the network and beyond (e.g., to network 90) by the plurality of PDSNs such as PDSN 60 and PDSN 70. PTT calls are packet data communications that use voice over internet protocol ("VOIP") technology to carry voice between handsets as packet data.

Generally, in a PTT call, the requesting handset establishes a connection with the target handset and the caller speaks into the phone. The caller's voice is split into thousands (or more) of data packets that are each sent over wireless communication network 35 to the PTT server 80. The PDSNs route these packets through the wireless communication network 35 to their ultimate destination at either the PTT server 80 or the target handset 30, as appropriate. The management of established PTT calls is well known in the art and will therefore not be described in any further detail.

Figure 2:
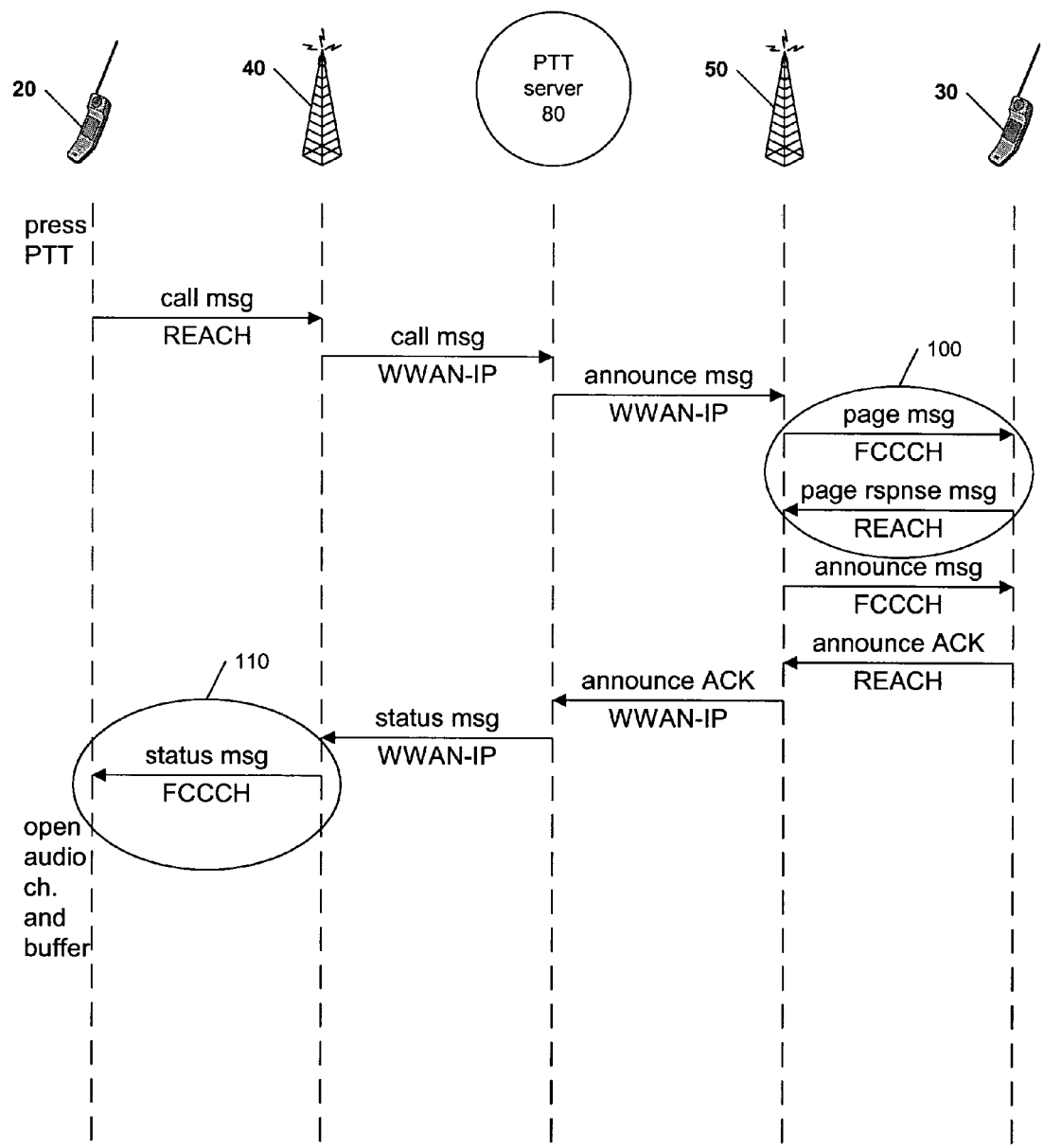
FIG. 2 is a flow diagram illustrating an example sequence of messages for establishing a push-to-talk call over a wireless communication network.

FIG. 2 is a flow diagram illustrating an example sequence of messages for establishing a push-to-talk call over a wireless communication network. In the illustrated embodiment, a requesting handset 20 requests a PTT call with a target handset 30. To establish the PTT call, a series of messages are sent over the wireless communication network that communicatively links the two handsets. Additionally, in the illustrated embodiment, a PTT server manages the process. Over the air communications take place between each of the handsets 20 and 30 and their respective base stations 40 and 50. Although two base stations are shown, if the handsets are in close proximity to each other, a single base station may be sufficient. Furthermore, if the handsets are moving, then additional base stations may be required.

Initially, at the requesting handset 20, the caller initiates a PTT call. For example, the caller may press a specific button on the handset 20 or enter a series of commands through the user interface to initiate the PTT call. Once the caller has provided the instruction to establish the PTT call, the handset 20 sends a CALL message to the base station 40. The CALL message is sent over the air using the reverse enhanced access channel ("REACH"), which can provide up to 38.4 kilobytes per second of data bandwidth.

When the base station 40 receives the CALL message from the handset 20, the base station 40 forwards the CALL message to the PTT server 80. This message is sent as packet data over a portion of the wireless wide area network ("WWAN"). When the PTT server receives the CALL message from the base station, the PTT server 80 creates an ANNOUNCE message to be sent to the target handset 30. The PTT server 80 sends the ANNOUNCE message over the WWAN to a base station controller that manages a plurality of base stations that cover the geographical region where handset 30 is located.

In one embodiment, a PAGE message is broadcast over the plurality of base stations to precisely locate the handset 30. For example, the PAGE message may be sent in a control channel such as the forward common control channel ("FCCCH") and when received by the handset 30, the handset replies with a RESPONSE message that is sent in the REACH channel. Because the RESPONSE message is received by a particular base station 50, the combination 100 of PAGE and RESPONSE messages precisely locates handset 30. Once the handset 30 is precisely located, then same base station 50 sends the ANNOUNCE message to the handset 30 in the FCCCH channel and receives a response from the handset 30 acknowledging receipt of the ANNOUNCE message and accepting the PTT call. The response message from the handset 30 is the ANNOUNCE ACKNOWLEDGEMENT ("AACK").

Alternatively, rather than broadcasting a PAGE message over a plurality of base stations in the FCCCH channel, the ANNOUNCE message itself can be broadcast over the plurality of base stations in the FCCCH channel. Although the size of the ANNOUNCE message is larger than the size of the PAGE message, the additional resource burden on the wireless communication network is negligible due to the significant bandwidth available in the FCCCH channel. Accordingly, additional time in the setup process can be saved by broadcasting the ANNOUNCE message over a plurality of base stations that cover the approximate geographic region where the handset 30 is expected to be located.

Advantageously, handset 30 periodically registers with the network by sending a STATUS message to the base station that covers the region where the handset 30 is currently located. The registration process is well known in the art and will therefore not be described in further detail. The advantage of the registration process is that it provides the network with a discrete and limited set of base stations through which the handset 30 is expected to be successfully contacted.

Once the handset 30 responds with the AACK message, the base station 50 forwards the AACK message to the PTT server 80 via the WWAN. Next the PTT server 80 sends a CONNECTION STATUS message 110 ("STATUS") to the requesting handset 20 via the base station 40. At the base station 40, the STATUS message 110 is sent over the air to the handset 20 in the FCCCH channel. Advantageously, sending the STATUS message 110 to the handset 20 in the FCCCH channel avoids any delay that may be caused by waiting for the traffic channel to be established and then sending the STATUS message 110 the handset 20 in the traffic channel.

At the requesting handset 20, once the STATUS message 110 is received, the handset 20 opens up its audio channel and begins to process voice data received from the caller (i.e., the user of handset 20). Advantageously, the processed voice data can be buffered on the handset 20 until the traffic channel is established. Once the traffic channel is established, the buffered audio can be sent to handset 30 over the wireless communication network in the traffic channel, and the PTT call may proceed.

Figure 3:
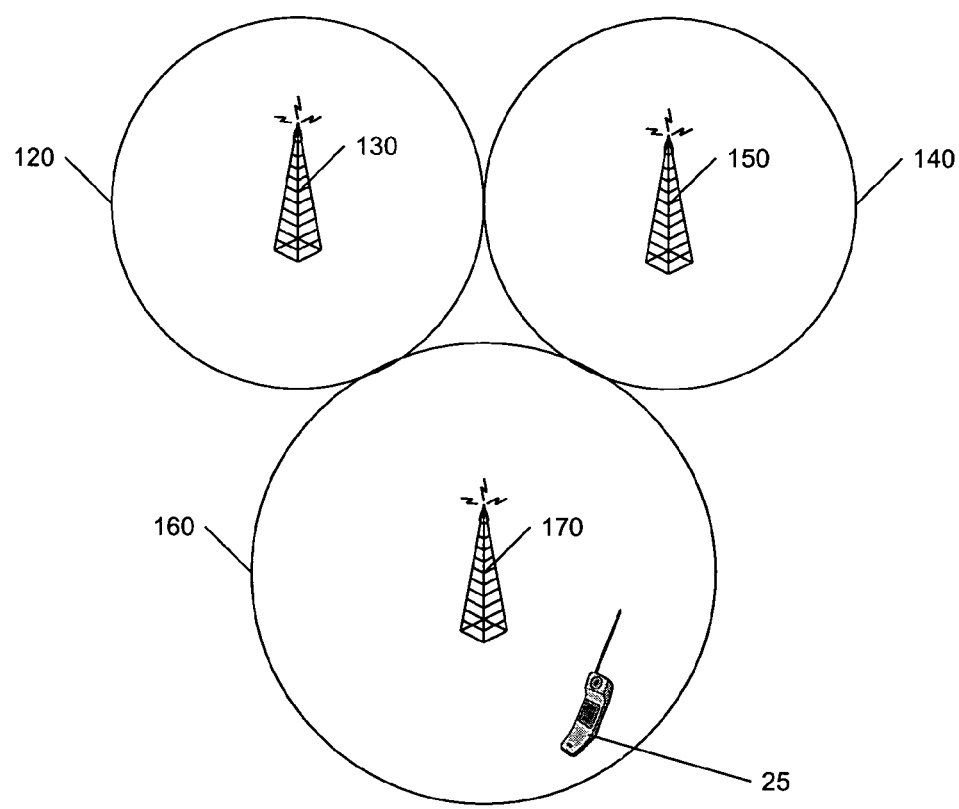
FIG. 3 is a block diagram illustrating a plurality of cells in a wireless communication network.

FIG. 3 is a block diagram illustrating a plurality of cells in a wireless communication network. In the illustrated embodiment, cells 120, 140, and 160 are shown with each cell covering its own geographic region. In each cell 120, 140, and 160 are respective base stations 130, 150, and 170. Handset 25 is located in cell 160 and can establish over the air communication with base station 170.

In an embodiment where handset 25 requests a PTT call, the handset 25 sends the CALL message to the base station 170 in the FCCCH channel and also receives the STATUS message from the base station 170 sent to the handset 25 in the FCCCH channel.

In an embodiment where handset 25 is the target handset for a PTT call, each of the base stations 130, 150, and 170 can broadcast the ANNOUNCE message in their respective cells 120, 140, and 160. Accordingly, the handset 25 receives the ANNOUNCE message from base station 170 and sends the appropriate AACK message over the air to base station 170 and back to the PTT server as previously described.

Figure 4:
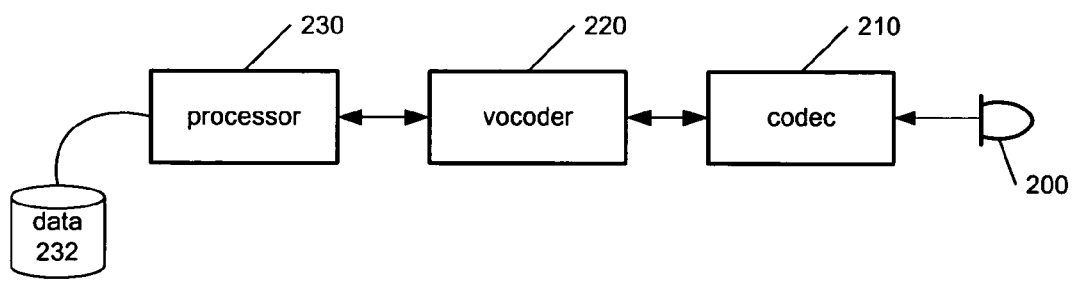
FIG. 4 is a block diagram illustrating an example audio channel in a wireless communication device.

FIG. 4 is a block diagram illustrating an example audio channel in a wireless communication device. In the illustrated embodiment, the audio channel comprises a microphone 200, a codec 210, and a vocoder 220. Additional or fewer (e.g., combined) components may also comprise the audio channel as will be understood by those having skill in the art. Additionally, a processor 230 configured with a data storage area 232 are shown.

During normal operation, when a call or other audio input function is not in progress, the components of the audio channel are turned off. For example, the microphone 200 may be muted and power withheld from the codec 210 and vocoder 220. Advantageously, turning off the audio channel when it is not needed can save valuable system resources on the handset.

In one embodiment, when the handset receives the STATUS message from the base station, although the traffic channel for the PTT call has not yet been established, the processor 230 may enable the audio channel in order to allow the caller to begin the PTT call. For example, the processor 230 may un-mute the microphone and activate the codec 210 and the vocoder 220 so that audio input (i.e., voice) from the caller may be processed by the codec 210 and vocoder 220. This processed audio input can then be stored by the processor 230 in the data storage area 232. The data storage area may be a FLASH memory, a buffer, or any other type of volatile or non-volatile storage. Once the traffic channel has been established, the processed and buffered audio content may be sent to the target handset over the wireless communication network in the traffic channel.

FIG. 5 is a flow diagram illustrating an example requesting handset process for establishing a push-to-talk call over a wireless communication network. Initially, in step 310, the requesting handset receives a PTT initiate instruction from the caller. For example, the caller may press a specific button the handset to initiate the PTT call. Alternatively, or in combination, the caller may navigate through a user interface to select various menu items, icons, or options that initiate the PTT call.

Once the PTT call has been initiated on the handset by the caller, in step 320 the handset sends a CALL request message over the air to the base station that covers the particular geographic cellular region where the handset is located. The CALL request is sent in the REACH control channel. In response to the call request, in step 330 the handset receives an over the air communication from the base station that confirms the establishment of the PTT call. This connection STATUS message does not necessarily confirm that a traffic channel has been opened to carry the VOIP data packets during the PTT call, but rather indicates that the target handset has been located and is available for the PTT call. The connection STATUS message is received by the handset in the FCCCH control channel.

Once the STATUS message has been received, the handset next activates its audio channel in step 340 so that the PTT call may begin. Additionally, the handset may also indicate to the caller that it is ready to receive audio input. At this point, any voice data (i.e., audio input) received by the handset from the caller is processed in the audio channel and buffered on the handset, as illustrated in step 350. The handset continues to buffer the processed audio data and waits for the traffic channel for the PTT call to be established, as determined by the handset in step 360. While the traffic channel has not been established, the handset continues to buffer processed audio data. Once the traffic channel is established, in step 370 the handset sends the buffered audio data to the target handset in the traffic channel and thereafter the PTT call ensues.

FIG. 6 is a flow diagram illustrating an example target handset process for establishing a push-to-talk call over a wireless communication network. Initially, in step 400, the target handset receives an ANNOUNCE message in an over the air communication from the base station. The ANNOUNCE message is received by the handset in the FCCCH control channel. Upon receiving the ANNOUNCE message, the handset send the AACK message back to the base station, as illustrated in step 410. The AACK message is sent in the REACH control channel.

Next, in step 420, the target handset sends a CALL request in the REACH channel that gets routed to the PTT server so that a traffic channel for the PTT call may be established for the target handset. In response to the CALL request, the handset receives the channel assignment, as shown in step 430. Once a channel has been assigned for the PTT call, the handset then begins to receive audio in the assigned traffic channel in step 440 and the PTT call between the requesting handset and the target handset takes place.

Figure 7:
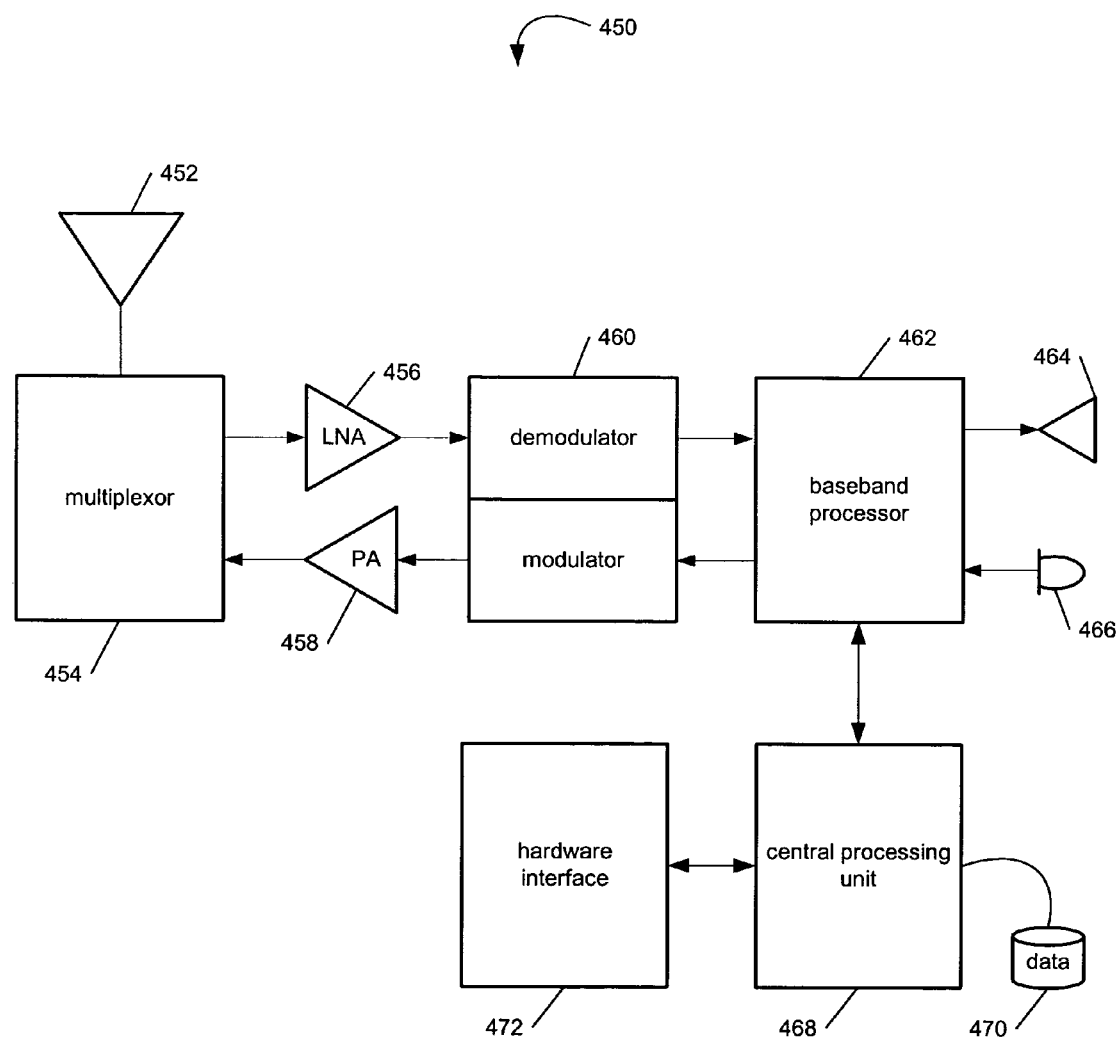
FIG. 7 is a block diagram illustrating an exemplary wireless communication device that may be used in connection with the various embodiments described herein.

FIG. 7 is a block diagram illustrating an exemplary wireless communication device 450 that may be used in connection with the various embodiments described herein. For example, the wireless communication device 450 may be employed as the requesting handset or target handset as previously described with respect to FIG. 1. However, other wireless communication devices and/or architectures may also be used, as will be clear to those skilled in the art.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between the transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Figure 8:
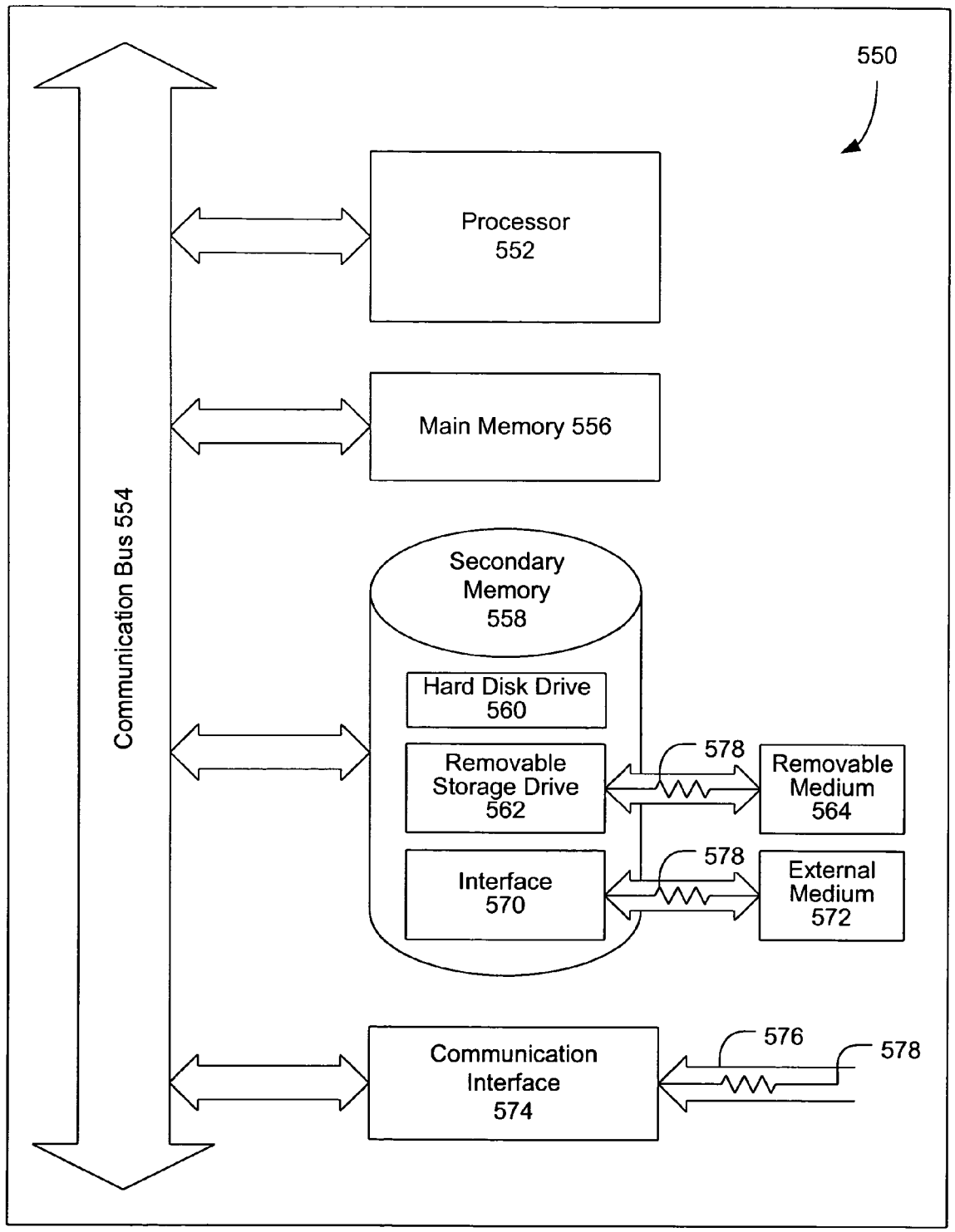
FIG. 8 is a block diagram illustrating an exemplary computer system as may be used in connection with various embodiments described herein.

FIG. 8 is a block diagram illustrating an exemplary computer system 550 that may be used in connection with the various embodiments described herein. For example, the computer system 550 may be used in conjunction with a push-to-talk server or packet data service node as previously described with respect to FIG. 1. However, other computer systems and/or architectures may also be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium .564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for initializing a push-to-talk call over a wireless communication network, comprising:
    receiving via a wireless communication network, a push-to-talk initialization request from a calling handset, the request identifying a recipient handset currently having no communicative links with the calling handset;
    establishing a communicative link between the calling handset and the recipient handset, including creating an announce message corresponding to the push-to-talk initialization request;
    addressing the announce message to the recipient handset;
    broadcasting the announce message over the wireless communication network, wherein the announce message is transmitted over a plurality of base stations the plurality of base stations covering a geographic region where the recipient handset is expected to be located;
    receiving via one of the plurality of base stations an acknowledgement message in response to the announce message; and
    transmitting a connection status message to the calling handset to instruct the calling handset to open an audio channel in response to receiving the acknowledgement message.

2. The method of claim 1, wherein the wireless communication network is a code division multiple access network.

3. The method of claim 2, wherein the broadcasting step further comprises sending the announce message in a control channel.

4. The method of claim 3, wherein the control channel is a forward common control channel.

5. The method of claim 1, wherein the acknowledgement message is received in a control channel.

6. The method of claim 5, wherein the control channel is a reverse enhanced access channel.

7. A system for initializing a push-to-talk call over a wireless communication network, comprising:
    a target handset configured for over the air communication in a wireless communication network;
    a plurality of base stations configured to communicate over the air with the target handset, wherein a push-to-talk announce message is broadcast to the target handset over the plurality of base stations, the plurality of base stations covering a geographic region where the target handset is expected to be located, the push-to-talk announce message originating from a calling handset currently having no established communicative links with the target handset, the push-to-talk announce message configured to establish a communicative link with the target handset,
    wherein a first base station receives an acknowledgement message from the target handset in response to the announce message; and
    wherein the first base station is configured to open an audio channel in response to the acknowledgement message.

8. The system of claim 7, wherein the wireless communication network is a code division multiple access network.

9. The system of claim 8, further comprising a plurality of control channels in the wireless communication network, wherein the push-to-talk announce message is broadcast to the target handset in a forward common control channel.

10. The system of claim 7, further comprising a push-to-talk server, wherein the push-to-talk server initiates the push-to-talk announce message.

11. The system of claim 7, wherein the acknowledgement message is received by the first base station in a control channel.

12. The system of claim 11, wherein the control channel is a reverse enhanced access channel.

13. A method for initializing a push-to-talk call between a calling handset and a recipient handset over a wireless communication network, comprising:

receiving at a base station via a reverse link channel in a wireless communication network, a push-to-talk initialization request from a calling handset, the request, identifying a single recipient handset currently having no communicative links with the calling handset;

establishing a communicative link between the calling handset and the recipient handset, including converting the reverse link channel push-to-talk initialization request to an internet protocol push-to-talk initialization request message;

sending the internet protocol push-to-talk initialization request message to a push-to-talk server;

creating an internet protocol push-to-talk announce message corresponding to the internet protocol push-to-talk initialization request;

sending the internet protocol push-to-talk announce message to a plurality of base stations covering a geographic region where the recipient handset is expected to be located;

creating at each of the plurality of base stations a control channel push-to-talk announce message addressed to the recipient handset;

broadcasting the control channel push-to-talk announce message from the plurality of base stations;

receiving from the recipient handset an acknowledgement message corresponding to the push-to-talk announce message at a first base station via a reverse link channel; and opening an audio channel between the calling handset and the recipient handset in response to the acknowledgement message corresponding to the push-to-talk announce message.

14. The method of claim 13, wherein the wireless communication network is a code division multiple access network.

15. The method of claim 13, wherein the broadcasting step further comprises sending the announce message in a control channel.

16. The method of claim 15, wherein the control channel is a forward common control channel.

17. The method of claim 13, wherein the acknowledgement message is received in a control channel.

18. The method of claim 17, wherein the control channel is a reverse enhanced access channel.

* * * * *